(12) United States Patent
Randall (10) Patent No.: US 7,777,368 B2
(45) Date of Patent: Aug. 17, 2010

(54) REDUNDANT POWER SUPPLY WITH PULSE WIDTH MODULATION SOFT START FEATURE

(75) Inventor: Anthony L Randall, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 723 days.

(21) Appl. No.: 11/702,239

(22) Filed: Feb. 5, 2007

(65) Prior Publication Data
US 2008/0185914 A1    Aug. 7, 2008

(51) Int. Cl.
*H02J 1/00*    (2006.01)
(52) U.S. Cl. ............................ 307/81; 307/87; 323/908
(58) Field of Classification Search ................. 307/64, 307/66, 70, 80, 81, 86, 87; 323/901, 908; 363/49
See application file for complete search history.

(56) References Cited

U.S. PATENT DOCUMENTS

| | | | |
|---|---|---|---|
| 6,181,029 B1 * | 1/2001 | Berglund et al. | ............... 307/66 |
| 6,414,860 B1 * | 7/2002 | Li | ............................... 363/49 |
| 2004/0018918 A1 | 1/2004 | Reyes et al. | |
| 2005/0068085 A1 | 3/2005 | Nalbant | |
| 2005/0275388 A1 | 12/2005 | Takimoto et al. | |
| 2006/0023476 A1 | 2/2006 | Fosler | |
| 2006/0033647 A1 | 2/2006 | Leung et al. | |
| 2006/0132105 A1 | 6/2006 | Prasad et al. | |
| 2006/0245221 A1 | 11/2006 | Ohshima et al. | |
| 2007/0032351 A1 | 2/2007 | Reyes et al. | |

* cited by examiner

*Primary Examiner*—Jessica Han
(74) *Attorney, Agent, or Firm*—Campbell Stephenson LLP (57) ABSTRACT

Various systems and methods for providing a pulse width modulation soft start feature in a redundant power supply are disclosed. One method involves comparing an input voltage, which is received from a load unit, to a threshold voltage. If the input voltage is less than the threshold voltage, a PWM signal is used to control a switch, which is configured to electrically couple a redundant power supply to the load unit when closed. The duty cycle of the PWM signal is then modified according to a predetermined sequence.

21 Claims, 4 Drawing Sheets

REDUNDANT POWER SUPPLY WITH PULSE WIDTH MODULATION SOFT START FEATURE

FIELD OF THE INVENTION

This invention relates to redundant power supplies and, more importantly, to redundant power supplies having a soft start feature.

BACKGROUND

Redundant Power Supply (RPS) systems provide a backup source of power for a system. If the system's primary power source fails or if the system otherwise loses power, the redundant power supply quickly turns on an auxiliary power supply and couples the auxiliary power supply to the system. Redundant power supply systems are designed to provide auxiliary power supply to the system quickly enough that the system can continue operating throughout the transition from primary to auxiliary power. Thus, a redundant power supply can provide protection against system failure or outage.

When a system that has never been powered up or whose voltage has already fallen below a certain level is coupled to the output port of a redundant power supply, very high current can flow. This current flows until the input capacitors within the system that is being powered by the redundant power supply have an opportunity to fully charge. This initial surge of current is referred to as inrush current.

High inrush current is undesirable for several reasons. Excessive inrush current can damage system components, cause various system errors, and reduce the available supply voltage. In some situations, high inrush current can even cause brownout situations in which the redundant power supply needs to shut down and restart.

Techniques to limit inrush current are often impractical. For example, many inrush-limiting techniques involve providing current measurement feedback to the redundant power supply controller. Unfortunately, current measurement feedback is often too expensive to be implemented in a cost-effective manner. Additionally, the voltage drop across the current sense element used with current measurement feedback is often undesirable. Accordingly, new techniques for reducing inrush current are desirable.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A redundant power supply (RPS) includes control logic that provides a pulse width modulation (PWM) soft start feature to limit inrush current. The control logic implements the PWM soft start feature by controlling the duty cycle of a PWM signal, which in turn controls the switch that couples the auxiliary power supply to the load unit. When a situation requiring soft start is detected, the control logic sets the duty cycle of the PWM signal to a value that is less than 100%. The control logic then increases the duty cycle of the PWM signal according to a predetermined sequence until the duty cycle eventually reaches 100%.

Figure 1:
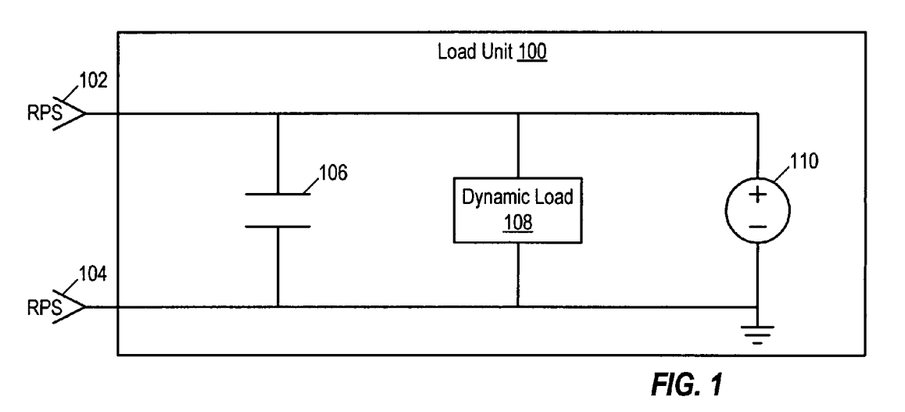
FIG. 1 is a circuit diagram of a load unit that can be coupled to a redundant power supply.

FIG. 1 is a circuit diagram of a load unit (LU) 100 that can be coupled to an redundant power supply. As shown, load unit 100 includes at least two ports 102 and 104, which can each be coupled to a redundant power supply (RPS). In particular, port 102 can be coupled to receive auxiliary power from the redundant power supply as well as to allow the redundant power supply to detect the current voltage being supplied by the internal power supply within load unit 100. Port 104 can be coupled to a ground port of the redundant power supply. Additional ports within load unit 100 can also be coupled to the redundant power supply. For example, another port can be used to provide a device identifier (e.g., identifying the model number or otherwise identifying what type of device load unit 100 is) that identifies load unit 100 to the redundant power supply.

Load unit 100 can include a variety of different circuitry designed to perform a variety of different functionality. Here, that circuitry is modeled using capacitor 106, dynamic load 108, and internal voltage source 110, which are coupled in parallel. Examples of components that can be represented by load unit 100 include networking devices, such as routers, switches, bridges, and gateways, as well as other electronic devices (e.g., personal computers, servers, network appliances, and the like).

Figure 2:
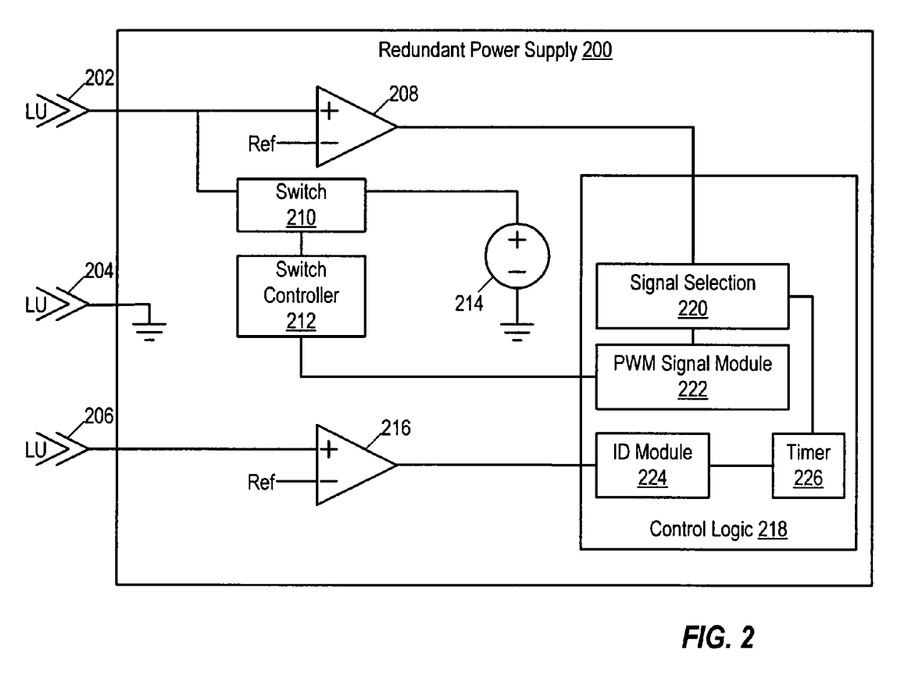
FIG. 2 is a circuit diagram of a redundant power supply, according to one embodiment.

FIG. 2 is a circuit diagram of a redundant power supply 200. As shown, redundant power supply 200 includes several ports 202, 204, and 206 that can be coupled to a load unit (LU) such as load unit 100 of FIG. 1. Redundant power supply 200 also includes a voltage comparator 208, a switch 210, a switch controller 212, power supply 214, a second voltage comparator 216, and control logic 218. Control logic 218 includes a signal selection module 220 and a pulse width modulation (PWM) signal module 222.

Port 202 is configured to be coupled the power supply of the load unit (e.g., via a port such as port 102 of FIG. 1). Port 202 is coupled to one input of voltage comparator 208; the other input of voltage comparator 208 is coupled to a reference voltage. By comparing the voltage being supplied by the load unit's power supply to the reference voltage, redundant power supply 200 can determine whether it is necessary to supply auxiliary power to the load unit.

Port 202 is also configured to couple voltage source 214 to the load unit, dependent upon the status (e.g., open or closed) of switch 210. Thus, if redundant power supply 200 detects that the load unit's power supply is failing (e.g., based upon the output of voltage comparator 208), redundant power supply 200 can cause switch 210 to close, which in turn causes voltage source 214 to be coupled to the load unit via port 202.

Port 204 is configured to be coupled to the ground port of the load unit. For example, port 204 can be coupled to port 104 of FIG. 1. Port 204 allows the load unit and the redundant power supply to share a common ground voltage.

Port 206 is an optional port that is configured to receive an identification signal from the load unit. In some embodiments, redundant power supply 200 simply uses this identification signal to determine whether a load unit is currently coupled to the redundant power supply. The redundant power supply can be configured to only couple voltage source 214 to port 202 if there is a load unit currently coupled to the redundant power supply.

In other embodiments, the redundant power supply additionally uses the identification signal received via port 206 to determine what type of load unit, if any, is currently coupled to the redundant power supply. For example, a redundant power supply can be designed to support multiple different types of load units, at least some of which may have different power supply requirements. Accordingly, such a redundant power supply can vary the characteristics (e.g., voltage) of the auxiliary power supply, based upon the type of load unit currently coupled to the redundant power supply. For example, such a redundant power supply can include functionality to selectively couple one of several different voltages to port 202. The particular voltage to select can be identified based upon the identification signal received via port 206. It is noted that the identification signal can include several component signals (e.g., a six-bit binary device identifier can be represented by six identification signals, in which case six comparators can be used to determine the value of each of the six identification signals).

A voltage comparator 216 is coupled to receive the identification signal and to compare that signal to a reference voltage. The output of voltage comparator 216 can indicate whether a load unit is currently coupled to the redundant power supply (e.g., if the identification signal is higher than the reference voltage, voltage comparator 216 can output a signal indicating that a load unit is currently present; if the identification signal is lower than the reference voltage, voltage comparator 216 can output a signal indicating that no load unit is present). If the identification signal identifies a type of load unit, the output of voltage comparator can also indicate what type of load unit is currently coupled to the redundant power supply. It is noted that some embodiments can include multiple voltage comparators 216 (e.g., if the identification signal includes multiple component signals, as described above) in order to detect multiple identification signal values.

The value(s) detected by voltage comparator(s) 216 can be provided to ID module 224, which is configured to determine whether a load unit is present based upon the signal. In some embodiments, ID module 224 is also configured to determine which type of load unit is present, based upon the signal or signals received from comparator(s) 216.

Voltage comparator 208 can, as noted above, be used to detect whether the load unit's power supply is failing. Voltage comparator 208 can also (or alternatively, in which case another voltage comparator can be used to detect a failing power supply in a load unit) detect whether the load unit's supply voltage has fallen beneath a prespecified threshold voltage. If the supply voltage is lower than the threshold voltage, redundant power supply 200 will trigger soft start functionality. The prespecified threshold voltage can be selected based on characteristics of the redundant power supply and the type(s) of load units supported by the redundant power supply, such that soft start functionality will be triggered in situations in which the inrush current is likely to exceed the tolerance of the redundant power supply. It is noted that in many embodiments, several voltage comparisons are made (e.g., through the use of several reference voltage inputs to a voltage comparator and/or through the use of several voltage comparators) in order to detect both whether the load unit's power supply is failing and whether the redundant power supply's soft start functionality should be used.

The outputs of voltage comparator 208 (which indicates whether the load unit's power supply has failed and/or whether the load unit's supply voltage has dropped below a certain threshold) and voltage comparator 216 are input to control logic 218. Control logic 218 controls whether the redundant power supply provides auxiliary power to the load unit based upon these two inputs. If a load unit is currently coupled to the redundant power supply and if that load unit's power supply is failing, control logic 218 will send a control signal to switch controller 212, which will in turn cause switch controller 212 to close switch 210, coupling voltage source 214 to the load unit via port 202. Thus, the control signal provided to switch controller 212 by control logic 218 will be used to control switch 210.

Switch 210 can be implemented using one or more transistors. Similarly, switch controller 212 can be implemented using a circuit that is designed to cause the transistor(s) to act as a switch. Switch 210 can also be implemented as an electro-mechanical switch where controller 212 closes an electrical circuit mechanically.

Control logic 218 includes signal selection module 220, which is configured to determine whether the soft start feature of redundant power supply 200 should be used to limit inrush current. Signal selection module 220 receives the output from voltage comparator 208. If this signal indicates that the load unit's supply voltage has fallen below a certain threshold, signal selection module 220 will trigger the soft start functionality. If the signal indicates that the load unit's supply voltage is failing but has not yet fallen below the threshold, signal selection module will cause the redundant power supply to supply auxiliary power but will not trigger the soft start functionality. If the signal indicates that the load unit's power supply is not failing, or if the signal provided by voltage comparator 216 indicates that no load unit is currently coupled to the redundant power supply, no auxiliary power will be supplied.

In one embodiment, the redundant power supply selects the control signal (either a 100% duty cycle signal or the PWM signal having a less than 100% duty cycle) based (at least in part) upon whether timer 226 has expired. Timer 226 expires when timer 226 counts down to a prespecified minimum value (or up to a prespecified maximum value) from a prespecified starting value. Timer 226 can be started at the beginning of a load unit identification process (e.g., as performed by one or more voltage comparators 216 in conjunction with ID module 224). This process can begin when a new load unit is detected (e.g., due to a change in voltage on port 206). Timer 226 can be used to "de-bounce" the load unit identification process by requiring that the timer expire before a final determination as to the presence and/or type of attached load unit is made. This allows any interface voltage transients time to settle without causing an error in the load unit identification process. In one embodiment, timer 226 is configured to expire one second after starting.

As noted above, timer 226 can also be used in control signal selection. In one embodiment, the PWM soft start feature is only triggered if the load unit's supply voltage drops below the threshold for triggering the soft start before timer 226 has expired (this detects situations in which a new load unit does not have power). Thus, in such an embodiment, if any type of failure is detected after timer 226 expires, the 100% duty cycle control signal will be selected.

In one embodiment, control logic 218 is implemented using a field-programmable gate array (FPGA) or other programmable logic device (PLD). In other embodiments, control logic 218 is implemented using program instructions that are executed by a processing device. Control logic 218 can also be implemented using an application specific integrated circuit (ASIC) designed to provide the functionality described herein.

PWM signal module 222 is configured to generate a pulse width modulated (PWM) signal, based upon one or more control signals received from signal selection module 220. If signal selection module indicates that no auxiliary power should be supplied, PWM signal module 222 will not generate any PWM signal. Accordingly, no signal is provided to switch controller 212 and switch 210 will remain open, preventing voltage source 214 from being coupled to port 202.

If signal selection module 220 indicates that auxiliary power should be supplied but that the soft start feature should not be used, PWM signal module 222 will generate a 100% duty cycle PWM signal. This signal causes switch controller 212 to close switch 210 and to keep switch 210 closed continually for as long as PWM signal module 222 continues to output the 100% duty cycle signal.

If signal selection module 220 indicates that auxiliary power should be supplied and that the soft start functionality should be used, PWM signal module 222 will output a PWM signal having a duty cycle that is less than 100% to switch controller 212. PWM signal module 222 will then incrementally increase the duty cycle of this signal, until the duty cycle reaches a prespecified maximum value (e.g., 100%).

Receipt of a PWM signal with a duty cycle of less than 100% will cause switch controller 212 to alternately open and close switch 210. The duration of time that switch 210 remains closed each cycle depends upon the duty cycle and frequency of the PWM signal. In particular, the duty cycle of the PWM signal controls the percentage of time, each cycle, that the switch is closed (e.g., if the duty cycle is 10%, the switch will be closed 10% of each cycle), while the frequency of the PWM signal determines the duration of each cycle.

Using a PWM signal with a duty cycle of less than 100% allows the redundant power supply to "soft start" the power being supplied to the load unit, limiting inrush current. Switch 210 is repeatedly opened and closed in such a manner as to slowly charge up the input capacitors (e.g., as represented by capacitor 106 of FIG. 1) of the load unit while limiting the inrush current provided by the redundant power supply. In particular, switch 210 is only closed for long enough to allow an incremental charge of the load unit's capacitors each cycle of the PWM signal.

The PWM signal generated by PWM signal module 222 has several characteristics, including duty cycle and frequency or pulse width. These characteristics can be prespecified or calculated (prior to beginning generation of the PWM signal) according to prespecified equations. Additional parameters, including a number of pulses and a step size, control how the duty cycle of the PWM signal is increased by PWM signal module 222. These additional parameters can also be prespecified and/or precalculated. Prespecified parameters and/or equations can be stored on a memory device (not shown) accessible to PWM signal module 222.

In one embodiment, a user can prespecify four parameters describing the PWM signal: an initial duty cycle, an initial pulse width (alternatively, a frequency or period can be specified), a number of pulses per duty cycle value, and a step size. The first two parameters describe the initial characteristics of the PWM signal, while the latter two parameters describe how the PWM signal should be modified over time. In response to these parameters, PWM signal module 222 will generate a PWM signal having the initial duty cycle and the prespecified pulse width (the PWM signal can be generated at a frequency needed to provide the specified pulse width at the initial duty cycle). PWM signal module 222 will count the pulses in the PWM signal, and once the number of pulses counted equals the prespecified number of pulses per duty cycle value, PWM signal module 222 will increase the duty cycle of the PWM signal by the prespecified step size. When the duty cycle is increased, PWM signal module 222 will also reset the counter used to count pulses. This behavior will be repeated until the duty cycle of the PWM signal equals 100% (or another prespecified maximum value).

In some embodiments, redundant power supply 200 is configured to support network devices, such as routers and switches. In one such embodiment, the initial parameters are 5% duty cycle, 150 ms pulse width, 16 pulses, and 1% step size. Accordingly, when signal selection module 220 indicates that the load unit's power supply is failing and that the soft start functionality should be used, PWM signal module 222 will generate a PWM signal having an initial pulse width of 150 ms and a 5% duty cycle. After sixteen pulses of this signal, PWM signal module 222 will increase the duty cycle to 6% and reset the counter. PWM signal module 222 will continue to count pulses and increase the duty cycle by 1% until the PWM signal's duty cycle reaches 100%, at which point the 100% duty cycle will be maintained for as long as needed (e.g., until the load unit is removed and/or repaired).

The parameters that describe a PWM signal are selected based upon a variety of factors. The initial pulse width (or frequency or period) is determined based upon the characteristics of switch controller 212. If switch controller 212 is implemented using a Miller capacitor and resistor network, the turn-on delay of that network can be used to select the pulse width. For example, the desired pulse width is one that exceeds the turn-on delay of the switch controller 212 so that the PWM signal will reliably propagate through the switch controller 212, even at the minimum duty cycle (the initial duty cycle of the sequence) of the PWM signal.

The initial duty cycle is selected based upon the maximum inrush current that can be reliably supplied by redundant power supply 200. In particular, the initial duty cycle is selected to be a duty cycle at which redundant power supply 200 will supply an inrush current less than or equal to the maximum inrush current.

The number of pulses to count before increasing the duty cycle is selected based upon the amount of charge needed to be provided at the capacitive load (e.g., capacitor 106 of FIG. 1) to cause the inrush current for the last pulse at a given duty cycle to be reduced to 75% of the initial inrush current (the inrush current during the first pulse for that same duty cycle). Accordingly, the power of the last pulse at a particular duty cycle will be half the power of the first pulse at that duty cycle.

The duty cycle step size is selected based upon how fast the load unit uses the charge that is generated in response to the redundant power supply supplying power to the load unit. The more quickly that the load unit uses this charge, the smaller the step size.

Because the control parameters described above are well characterized, there is no need for real-time feedback from the load unit. Thus, once PWM signal module 222 begins generating a PWM signal, PWM signal module 222 can simply modify the PWM signal according to the prespecified parameters until a 100% duty cycle is reached. There is no need to dynamically modify the PWM signal or the associated parameters based upon conditions in the load unit. Accordingly, costly feedback systems (such as current feedback systems) are not needed (however, such systems can be included in some embodiments, if desired).

In the illustrated embodiment, PWM signal module 222 generates a PWM signal having prespecified characteristics (e.g., duty cycle and pulse width) and modifies the PWM signal (by increasing the duty cycle) using prespecified parameters. In some embodiments, a memory device (not shown) such as a read only memory (ROM) or Flash memory device within redundant power supply 200 stores information identifying the PWM signal's initial characteristics and modification parameters. If redundant power supply 200 supports different devices that have different power requirements or characteristics (e.g., input capacitance), the memory device can store different PWM signal information for each different type of device supported by redundant power supply 200. Accordingly, PWM signal module 222 can select among multiple sets of PWM signal information based upon the signal provided by voltage comparator 216.

While the functionality of redundant power supply 200 has been described in the context of the particular implementation shown in FIG. 2, it is noted that other implementations can be used to provide the same or similar functionality. Additionally, while the redundant power supply shown in FIG. 2 includes particular components, other components can be used instead of and/or in addition to the components shown in FIG. 2. Similarly, some components (e.g., such as timer 226, at least as used in control signal selection) can be omitted or used differently than described above.

Additionally, it is noted that other embodiments can implement the PWM signal differently than described herein. For example, in some alternative embodiments, the number of pulses or cycles at each PWM duty cycle value may vary. For example, the number of pulses at a given PWM duty cycle may increase or decrease by one or more pulses, each time the PWM duty cycle is modified. Similarly, the duty cycle of the PWM signal may have slight variations from pulse to pulse, due to noise or due to intentional modification of the duty cycle. For example, in one embodiment, jitter in the PWM signal may cause the duty cycle of pulses at the same duty cycle to vary up to one-half the duty cycle step size from the specified duty cycle. Thus, in some embodiments, the PWM signal may not be perfectly described by the parameters (e.g., the PWM signal may contain jitter or other noise that causes the PWM signal to have a duty cycle that is slightly different duty cycle than the specified duty cycle).

Figure 3:
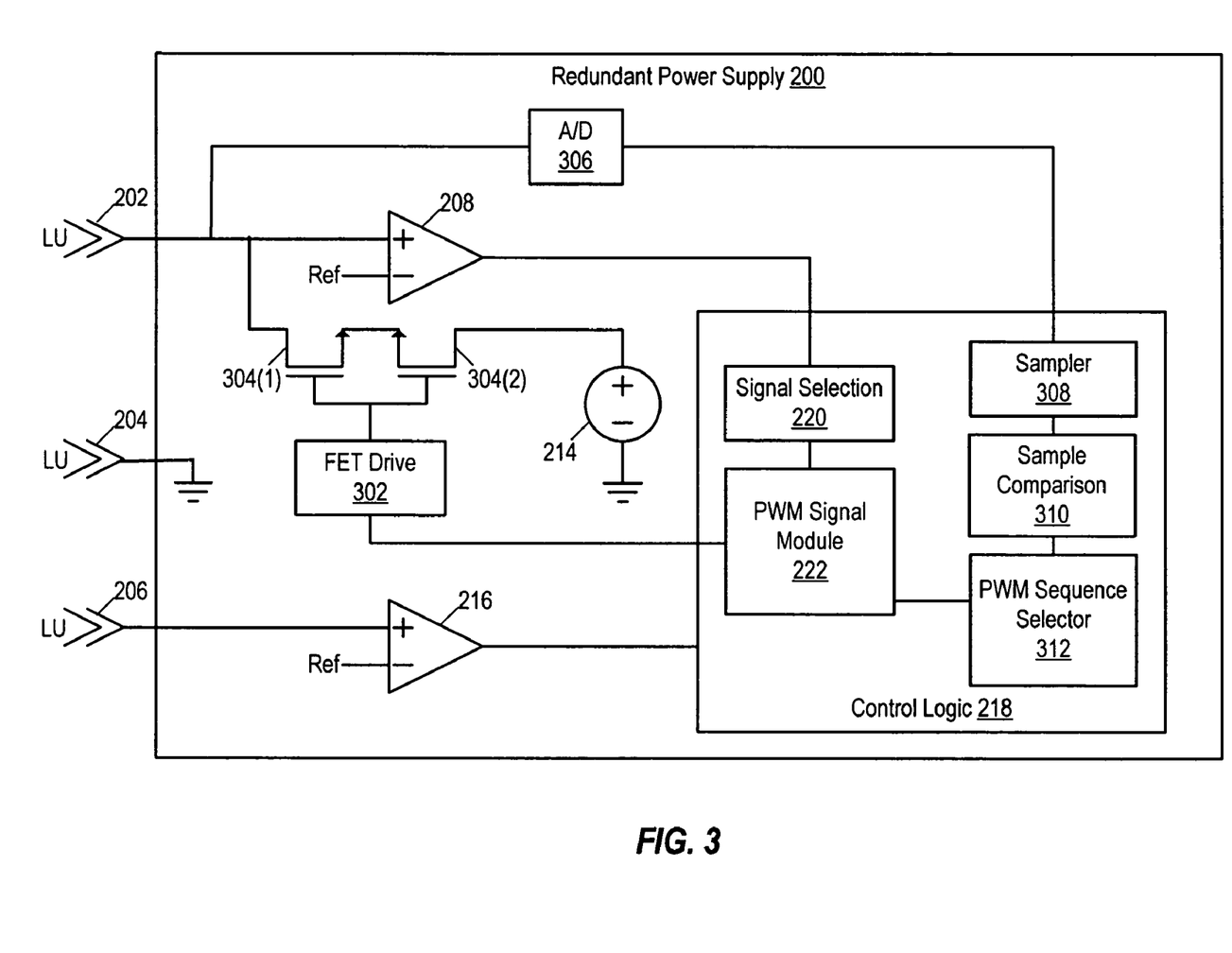
FIG. 3 is a circuit diagram of a redundant power supply, according to an alternative embodiment.

FIG. 3 is a circuit diagram of another embodiment of a redundant power supply 200. This version of redundant power supply 200 includes many of the same components as the version shown in FIG. 2. Similar components have been labeled using similar reference numbers. While ID module 224 and timer 226 of the embodiment shown in FIG. 2 are not shown in the embodiment of FIG. 3, it is noted that such components can also be included in embodiments that also include all or some of the additional components shown in FIG. 3.

In this embodiment, the switch (e.g., switch 210 of FIG. 2) that couples the redundant power supply's power supply to the load unit has been implemented using two field effect transistors (FETs) 304(1) and 304(2). Accordingly, the switch controller (e.g., switch controller 212 of FIG. 2) is implemented as a FET drive circuit 302.

An additional difference between the version of redundant power supply 200 shown in FIGS. 2 and 3 is that the version shown in FIG. 3 contains additional functionality to allow redundant power supply 200 to dynamically select among different potential PWM signals for a given load unit, dependent upon the actual characteristics of the load unit's supply voltage at the point in time that redundant power supply 200 detects that the load unit's power supply is failing. In the embodiment of FIG. 3, this additional functionality is implemented by analog-to-digital (A/D) converter 306, sampler 308, sample comparison module 310, and PWM sequence selector 312.

A/D converter 306 is configured to convert the signal received via port 202 to a digital signal and to provide the resulting digital signal to control logic 218. Sampler 308 within control logic 218 is configured to sample this signal and to provide samples to sample comparison module 310. Sample comparison module 310 compares successive samples in order to determine the rate at which the load unit's supply voltage is changing.

Based upon the output of sample comparison module 310, PWM sequence selector 312 is configured to dynamically select a suitable PWM sequence (a combination of initial PWM signal characteristics and parameters for modifying the PWM signal) for use in supplying auxiliary power to the load unit. PWM sequence selector 312 can either select from several prespecified sequences (e.g., each prespecified sequence can be associated with a particular output or range of outputs from sample comparison module 310) or dynamically generate information describing a sequence using a prespecified set of equations. Alternatively, PWM sequence selector 312 can select a PWM signal by selecting one of many points within a single PWM sequence as the start of the selected PWM signal (e.g., the PWM sequence has different duty cycles at time 1 (T1), time 2 (T2), and so on, and the PWM sequence selector 312 can select a PWM signal by selecting one of those times as the starting time of the selected PWM signal).

Thus, there are several ways that PWM sequences can be specified and selected. In one embodiment, each of several different sets of PWM parameters (each set describing a different PWM sequence) can be associated with a respective range of values. Sample comparison module 310 can provide a value to PWM sequence selector 312, which can then select the set of parameters whose associated range of values contains the value received from sample comparison module 310.

If prespecified equations are used, PWM sequence selector 312 can use the prespecified equations along with information provided by sample comparison module 310 to generate parameters describing an appropriate PWM sequence. For example, equations to generate the minimum pulse width, the initial duty cycle, duty cycle increment, and number of pulses per duty cycle value can be prespecified. One or more values received from sample comparison module 310 (as well as other values received from the load unit or derived based upon the load unit's characteristics) can then be input the these equations to generate the parameters describing the appropriate PWM sequence.

If a prespecified PWM sequence is provided (e.g., one for each particular type of load unit that redundant power supply 200 is designed to support), the information provided by sample comparison module 310 can be used to select a starting point within a given PWM sequence. In other words, each prespecified PWM sequence can represent multiple different PWM sequences, each of which begin at a different offset within that PWM sequence. For example, PWM sequence A can be selected for all load units of type A, and the information provided by sample comparison module 310 can then be used to select a starting point (e.g., the duty cycle to use as the initial duty cycle) within the PWM sequence. Thus, if PWM sequence A specifies an initial duty cycle of 5% and 2% duty cycle increments, the slew rate can be used to select, for example, that the actual PWM sequence to be generated by PWM signal module 222 should start at 7% (e.g., at the point in time within PWM sequence A of the first duty cycle increment).

It is noted that, once a PWM sequence is selected and the corresponding PWM signal is generated, the selected PWM sequence will continue to be used until the PWM signal's duty cycle reaches 100%. Thus, once the PWM signal is generated, the PWM sequence is not modified or restarted. This allows the PWM signal to be provided without requiring any circuitry to provide feedback from the load unit.

Figure 4:
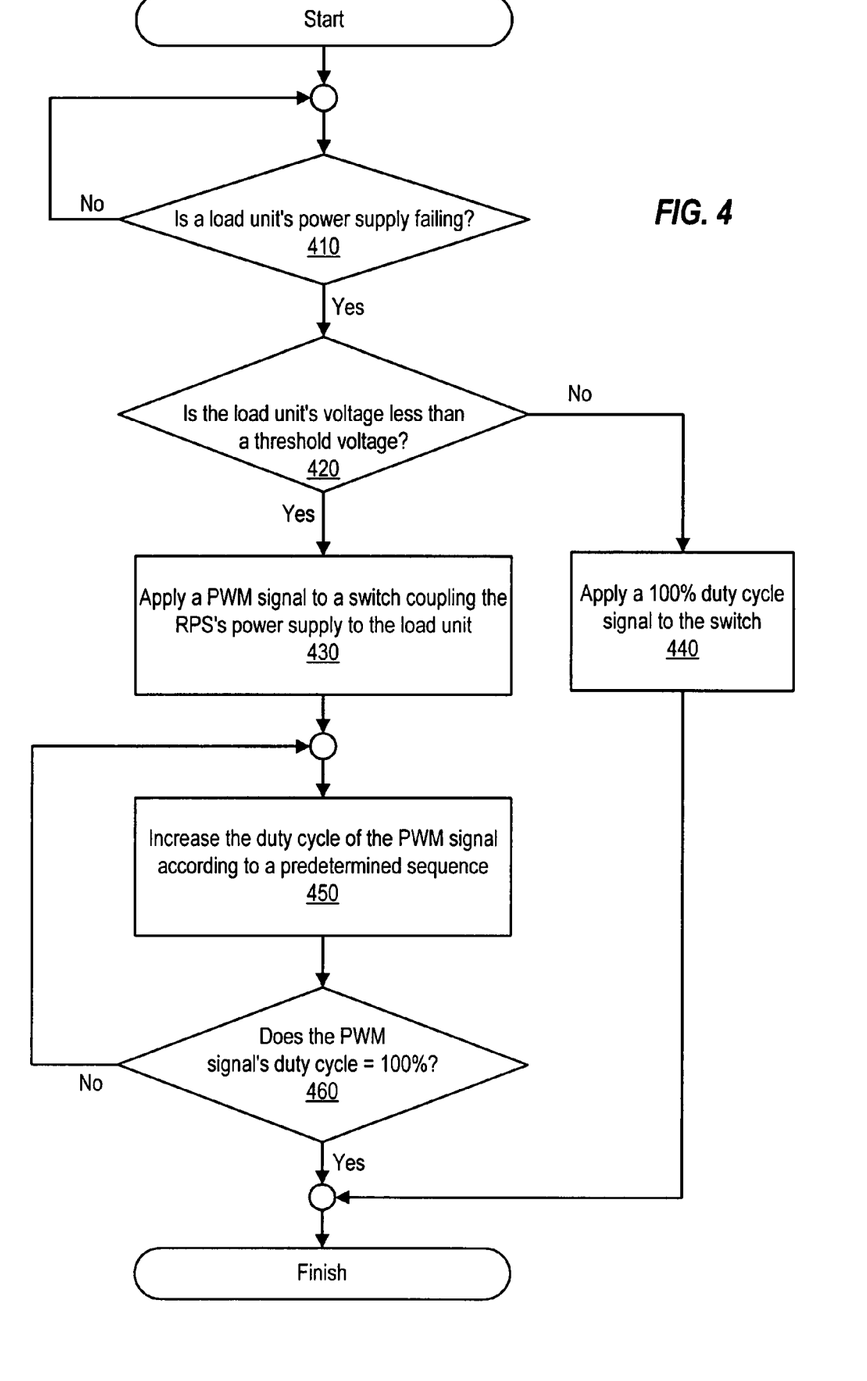
FIG. 4 is a flowchart of a method of performing a soft start of a redundant power supply, according to one embodiment.

FIG. 4 is a flowchart of a method of performing a soft start of a redundant power supply. The method of FIG. 4 can be performed by a redundant power supply such as those shown in FIGS. 2 and 3.

The method begins at 410, when a determination is made as to whether the load unit's power supply is failing. If the load unit's power supply is not failing, the redundant power supply continues to monitor the load unit.

If the load unit's power supply is failing, the redundant power supply determines whether the load unit's supply voltage is less than a threshold voltage, as shown at 420. If the load unit's supply voltage is greater than the threshold voltage, the redundant power supply will apply a 100% duty cycle signal to the switch that couples a voltage source within the redundant power supply to the load unit.

If the load unit's supply voltage is less than the threshold voltage, soft start functionality will be triggered. As shown at 430, a PWM signal having a duty cycle that is less than 100% will be applied to the switch that couples the voltage source within the redundant power supply to the load unit. The duty cycle of this PWM signal is then increased according to a predetermined sequence, as shown at 450. Operation 450 is repeated until the duty cycle of the PWM signal is 100%.

FIG. 4 shows particular types of operations that can be performed in one embodiment. Other embodiments can perform other operations instead of and/or in addition to those shown in FIG. 4. For example, some embodiments, can additionally determine whether a certain amount of time (e.g., using a timer such as timer 226 of FIG. 2) has elapsed since the load unit was coupled to the redundant power supply when determining whether to supply the PWM signal having a duty cycle that is less than 100% or the signal having a 100% duty cycle. Additionally, other embodiments can eliminate certain operations (e.g., such as operation 410, if it is only desirable to determine whether the load unit's supply voltage has dropped below the threshold voltage).

Figure 5:
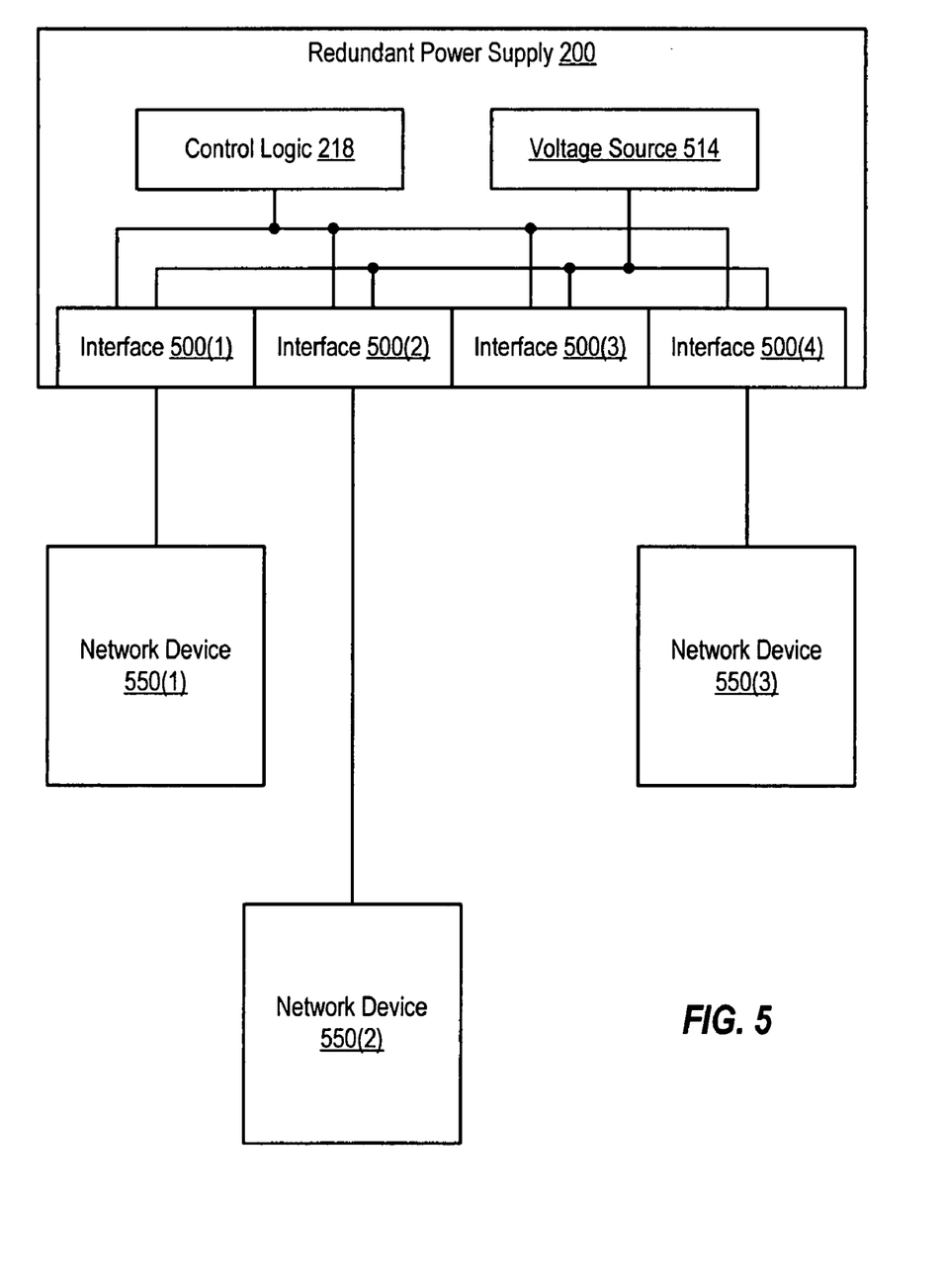
FIG. 5 is a block diagram of a system in which a redundant power supply supports multiple network devices, according to one embodiment.

FIG. 5 is a block diagram of a system in which a redundant power supply supports multiple network devices. In this example, redundant power supply 200 includes several interfaces 500(1), 500(2), 500(3), and 500(4). Interface 500(1) is coupled to network device 550(1), interface 500(2) is coupled to network device 550(2), and interface 500(4) is coupled to network device 550(3). Thus, redundant power supply 200 is currently supporting three network devices, and can support up to four network devices.

Each interface 500(1)-500(4) is configured to be coupled to a different network device. Each interface 500(1)-500(4) can include functionality (e.g., such as voltage comparator 216 of FIGS. 2 and 3) to detect the presence and/or type of network device coupled to that interface. Each interface 500(1)-500(4) can also include a ground port (e.g., port 204 of FIGS. 2 and 3) as well as a port (e.g., port 202 of FIGS. 2 and 3) that is coupled to the supply voltage of the network device and that can be selectively coupled to a voltage source within the redundant power supply.

Each interface 500(1)-500(4) can also include functionality (e.g., such as voltage comparator 208 and/or analog to digital converter 306) to monitor the load unit's supply voltage in order to provide control logic 218 with input usable to determine whether the load unit's power supply is failing and/or whether soft start functionality should be triggered. Each interface 500(1)-500(4) can also include a switch to couple a voltage source within the redundant power supply to the load unit as well as a switch controller.

Each interface 500(1)-500(4) is coupled to control logic 218 (e.g., such as the control logic shown in FIGS. 2 and/or 3) as well as to a voltage source 514. It is noted that multiple voltage sources can be provided (in which case each interface can be coupled to each voltage source).

Although the present invention has been described with respect to specific embodiments thereof, various changes and modifications may be suggested to one skilled in the art. It is intended such changes and modifications fall within the scope of the appended claims.

What is claimed is:

1. A method comprising:
comparing an input voltage to a threshold voltage, wherein the input voltage is received from a load unit;
if the input voltage is less than the threshold voltage, controlling a switch based upon a PWM signal, wherein the switch is configured to electrically couple a redundant power supply to the load unit; and
modifying a duty cycle of the PWM signal according to a predetermined sequence.

2. The method of claim 1, wherein
comparing the input voltage to a second threshold voltage; and
if the input voltage is less than the second threshold voltage and greater than the threshold voltage, controlling the switch based upon a signal having a one hundred percent duty cycle.

3. The method of claim 2, further comprising:
detecting whether a timer has expired; and
controlling the switch based upon the signal having the one hundred percent duty cycle, if the timer has expired.

4. The method of claim 1, further comprising:
selecting the predetermined sequence from a plurality of predetermined sequences, based upon a characteristic of the input voltage.

5. The method of claim 1, further comprising:
selecting the predetermined sequence, in response to identifying a characteristic of the input voltage.

6. The method of claim 1, wherein the load unit is a network device.

7. The method of claim 1, wherein the predetermined sequence comprises a predetermined pulse width, a predetermined initial duty cycle, a predetermined number of pulses per duty cycle value, and a predetermined duty cycle increment.

8. The method of claim 7, wherein the modifying the duty cycle of the PWM signal comprises:
counting a number of pulses in the PWM signal; and
increasing the predetermined initial duty cycle by the predetermined duty cycle increment, in response to the number of pulses equaling the predetermined number of pulses per duty cycle value.

9. The method of claim 1, wherein the modifying the duty cycle of the PWM signal comprises:
increasing the duty cycle of the PWM signal until the duty cycle of the PWM signal equals one hundred percent.

10. A system comprising:
a redundant power supply comprising:
a voltage comparator configured to compare an input voltage to a first threshold voltage;

a switch configured to couple a power supply to an output port; and a PWM signal module coupled to the voltage comparator and the switch, wherein the PWM signal module is configured to select a PWM signal to control the switch, if the input voltage is less than the first threshold voltage, and the PWM signal module is configured to modify a duty cycle of the PWM signal according to a predetermined sequence.

11. The system of claim 10, further comprising:
a network device coupled to the output port.

12. The system of claim 10, wherein the redundant power supply further comprises:
a second voltage comparator configured to compare a second input voltage to the first threshold voltage;
a second switch configured to couple the power supply to a second output port, wherein
if the second input voltage is less than the first threshold voltage, the PWM signal module is configured to select the PWM signal to
control the second switch, and
the PWM signal module is configured to modify a duty cycle of the PWM signal according to a predetermined sequence.

13. The system of claim 10, wherein the redundant power supply further comprises:
a signal selection module coupled to the PWM signal module, wherein
the signal selection module is configured to select either the PWM signal or a signal having a one hundred percent duty cycle; and
the PWM signal module is configured to provide a selected signal selected by the signal selection module to control the switch.

14. The system of claim 13, wherein
the signal selection module is configured to select the signal having a one hundred percent duty cycle if the input voltage is less than a second threshold voltage but greater than the first threshold voltage.

15. The system of claim 13, further comprising:
a timer coupled to the signal selection module, wherein
the signal selection module is configured to select the signal having a one hundred percent duty cycle if the timer has expired.

16. The system of claim 10, wherein the redundant power supply further comprises:
a PWM sequence selection module coupled to the PWM signal module, wherein
the PWM sequence selection module is configured to select the predetermined sequence from a plurality of predetermined sequences, based upon a characteristic of the input voltage.

17. The system of claim 10, wherein the redundant power supply further comprises:
a PWM sequence selection module coupled to the PWM signal module, wherein
the PWM sequence selection module is configured to calculate the predetermined sequence, in response to identifying a characteristic of the input voltage.

18. The system of claim 10, wherein
the predetermined sequence comprises a predetermined pulse width, a predetermined initial duty cycle, a predetermined number of pulses per duty cycle value, and a predetermined duty cycle increment.

19. The system of claim 18, wherein
the PWM signal module is configured to:
count a number of pulses in the PWM signal; and
increase the predetermined initial duty cycle by the predetermined duty cycle increment, in response to the number of pulses equaling the predetermined number of pulses per duty cycle value.

20. The system of claim 10, wherein
the PWM signal module is configure to increase the duty cycle of the PWM signal until the duty cycle of the PWM signal equals one hundred percent.

21. A system comprising:
means for comparing an input voltage to a threshold voltage, wherein the input voltage is received from a load unit;
means for controlling a switch based upon a PWM signal, if the input voltage is less than the threshold voltage, wherein
the switch is configured to electrically couple a redundant power supply to the load unit; and
means for modifying a duty cycle of the PWM signal according to a predetermined sequence.

* * * * *